April 9, 1935.  G. F. DRAKE  1,996,907
THERMOSTAT
Filed March 19, 1932
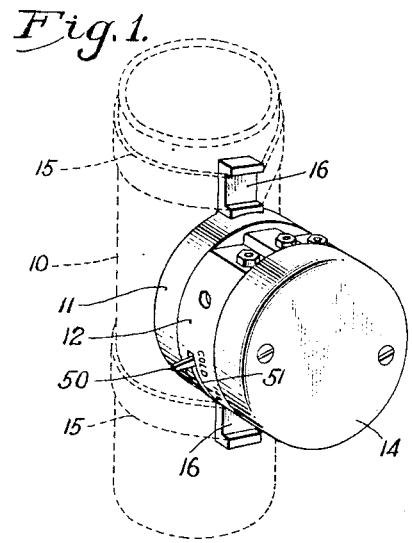
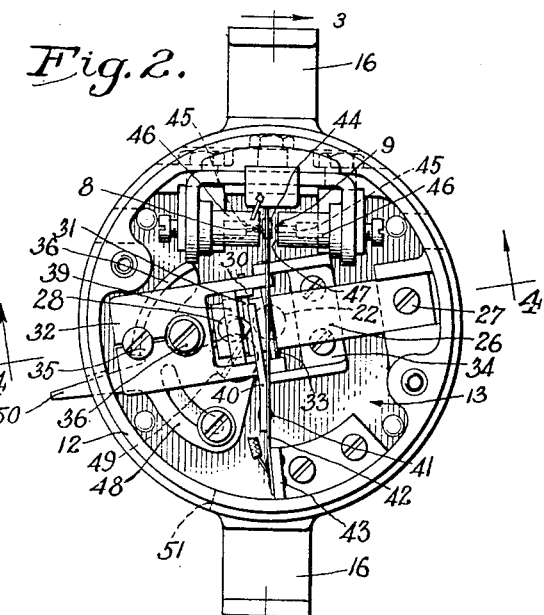
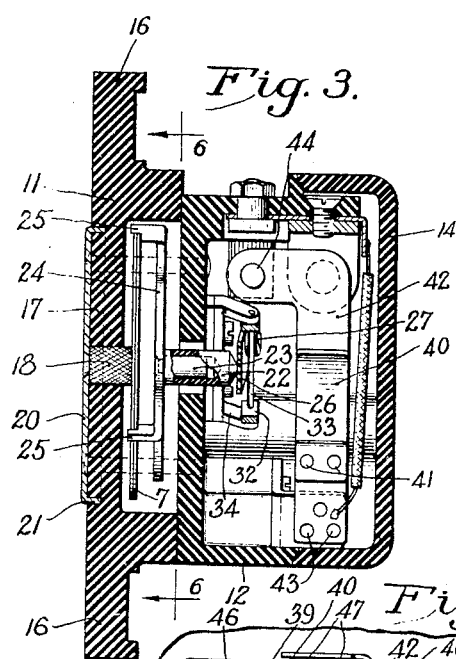
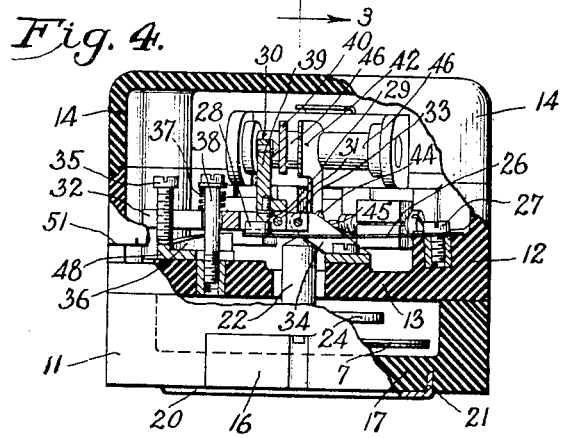
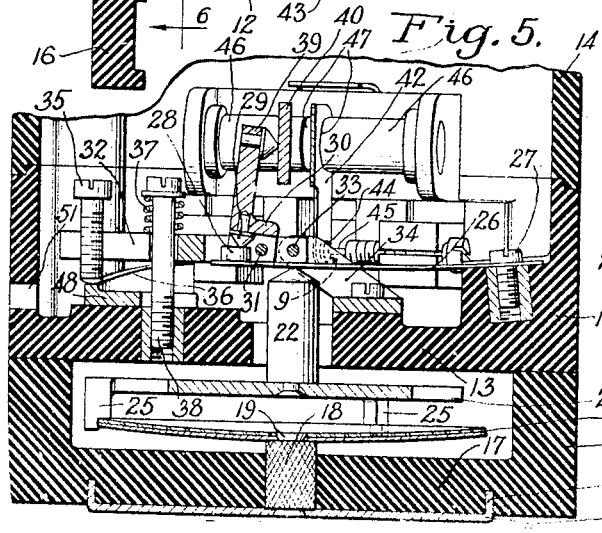
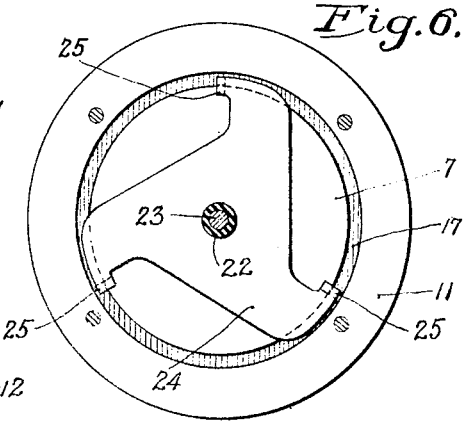
INVENTOR
George Forrest Drake,
BY Clindall, Parker + Carlson
ATTORNEYS Patented Apr. 9, 1935

1,996,907

UNITED STATES PATENT OFFICE 1,996,907

THERMOSTAT

George Forrest Drake, Rockford, Ill., assignor to Howard D. Colman, Rockford, Ill.

Application March 19, 1932, Serial No. 599,971

20 Claims. (Cl. 200—138)

This invention relates in general to thermostats and more particularly to those adapted to respond to changes in the temperature of a surface.

The primary object of the invention is to provide, in a thermostat of the above character, a new and improved construction of the thermo-sensitive element and its mounting by virtue of which construction the thermostat is rendered more sensitive to temperature changes than the surface thermostats heretofore employed.

A more detailed object is to provide a surface thermostat having a sensitive element in the form of a bimetallic sheet or plate to which heat from the control surface is conducted in a manner such that heat will be conducted in different directions away from the point of application to the element and thereby distributed rapidly and uniformly throughout the element.

Another object is to provide a novel mounting for the thermo-sensitive element of the thermostat rendering the same substantially unaffected by changes in the temperature of the surrounding air and by variations in the manner of supporting the thermostat.

The invention also resides in the novel character of the means for imparting the movements of the thermo-sensitive element to the controlling instrumentality and to the manner of adjusting the thermostat for response to different temperatures.

Other objects and advantages of the invention will become apparent from the following detailed description taken in connection with the accompanying drawing, in which Figure 1 is a perspective view of the improved thermostat illustrating the manner of mounting the same.

Fig. 2 is a plan view of the thermostat with its cover removed.

Figs. 3 and 4 are sectional views taken respectively along the lines 3—3 and 4—4 of Fig. 2.

Fig. 5 is an enlarged view similar to Fig. 4 showing the parts in a different position.

Fig. 6 is a section taken along the line 6—6 of Fig. 3.

In the form of the invention selected for illustration, the thermostat comprises generally a thermo-sensitive element in the form of a substantially flat sheet 7 of bimetallic sheet material arranged to actuate one or more control instrumentalities such as switches 8 and 9 in response to changes in the temperature of a surface such as that of a pipe 10. The operating parts are mounted within a casing composed of insulating material such as a phenolic condensation product and comprising, in the present instance, a base 11, a body 12 providing a partition 13 within the casing and a removable cover 14. The casing may be mounted conveniently through the medium of securing devices such as straps 15 engaging lugs 16 on the base 11 and serving to clamp the base firmly against the pipe or other surface, the temperature of which is to be detected.

In order that the thermostat will be substantially unaffected by the temperature of the surrounding air, the sheet 7, which preferably is in the form of a circular disk, is disposed in a recess defined by the base 11 and the partition 13. Projecting through the flat rigid wall 17 of the base and preferably molded in the wall so as to fit tightly therein is a stud 18 the inner end of which is securely attached as by a rivet 19 to the center of the disk 7 thereby accurately supporting the disk and allowing the same to warp or cup freely in response to changes in its temperature. The other end of the stud 18 terminates at the outer surface of the wall 17 and is secured as by riveting to a plate 20 lying against the wall and firmly attached thereto as by a flange 21 embedded in the wall. The plate 20 and the stud 18 are composed of good heat conducting material such as copper.

With the thermostat casing mounted on a pipe as shown in Fig. 1, the plate 20 will be held firmly in contact with the surface of the pipe and the plate, and the stud will, by conduction of heat thereto, maintain the disk 7 substantially at the temperature of the pipe. By joining the stud 18 to the center of the disk 7, the heat will be conducted toward and away from the stud in all directions depending on the relative temperatures of the pipe and the disk with the result that the disk will respond quickly to a change in the temperature of the pipe surface.

Owing to the rigidity of the base 11 and the manner of supporting the disk 7 thereon through the medium of the stud 18, it will be apparent that the calibration of the thermostat will not be affected in any way by changes in the manner of mounting the same.

In the present instance, the thermostatic disk 7 is arranged to be substantially flat (see Fig. 4) at normal room temperatures with the metal of high expansibility facing the wall 17 so that the disk will warp or bow into the shape shown in Fig. 5 upon an increase in temperature. Such relative axial movement between the center and outer peripheral edge of the disk is transmitted to the control switches 8 and 9 through the medium of a pin 22 composed of heat insulating material and projecting through an aperture in the partition made of such size as to avoid circulation of air, at least to any substantial degree, around the disk 7. To communicate the movements of the outer edge of the disk to the pin 22, the latter is mounted on a stud 23 projecting into one end of the pin and secured to the center of a rigid spider 24 the arms of which have lugs 25 at their ends formed with shoulders which fit over the edge of the disk at annularly spaced points, the spider being thereby supported by the disk 7 with the pin 22 alined with the stud 18.

At its upper end, the pin 22 bears against one side of a spring arm 26 extending parallel to the partition 13 and fixed at one end to the casing by a screw 27. Adjacent the pin 22, the arm 26 carries a hardened block 28 which bears against a hardened point 29 carried by a lever in the form of a bell crank 30 fulcrumed at 31 on the bifurcated end of a lever 32. The latter is pivoted at 33 on a bracket 34 secured to the partition 13. The opposite end of the lever 32 is supported by a screw 35 threading therethrough and held against a cam surface 36 by a spring 37 coiled about a screw 38 and urging the lever toward the partition 13.

Projecting substantially at right angles to the partition 13 is an arm 39 of the bell crank 30 bearing at its free end against one end of a short bar 40 extending at a slight angle to and having its opposite end attached at 41 to a spring arm 42 which is anchored to the casing body 12 at 43. The arm 42 carries a contact 44 which cooperates with stationary contacts 45 and 9. The arm 42 is stressed to bias the contact 44 in a direction to close the switch 8.

With the parts thus arranged, it will be apparent that the bell crank 30 is adapted to multiply the movement of the thermostatic disk 7 and that warping or cupping of the disk in response to an increase in its temperature causes the pin 22 to be projected through the partition 13 and the lever arm 39 to move to the right as viewed in Figs. 2 and 4 thereby carrying the movable contact 44 in a direction to close the switch 9. Upon flattening of the disk as a result of cooling therof, the lever arm 39 moves reversely allowing the spring 42 to open the switch 9 and close the switch 8. All lost motion in the operating parts is taken up by the spring arms 26 and 42 so that the switches respond accurately to the changes in the curvature of the disk 7.

If desired, a snap action in the opening and closing of the control switches may be obtained through the use of a magnet 46 having opposed poles 47 disposed on opposite sides of the spring arm 42 and spaced to be held a short distance from the spring when the latter is engaging either stationary contact 45 which serve as stops to limit the swing of the arm 42 as an armature and maintains the contact 44 against one of the contacts 45 until the spring has been stressed sufficiently to overcome the magnetic attraction whereupon the spring is moved quickly toward the other stationary contact. In order that such a magnetic detent will operate properly, the effective length of the spring 42 should be greater than that which would obtain if the arm 39 were to bear directly against the spring 42. By interposing the bar 40 in the manner above described between the lever arm 39 and the spring 42, the effective length of the spring 42 is increased to the desired degree.

To enable the thermostat to be set at will for response to different temperatures, means is provided in the present instance for varying the length of the motion-transmitting connection between the pin 22 and the movable contact 44. In the present instance, this means comprises a lever in the form of a plate 48 lying adjacent the partition 13 and swingable about a pivot 49 (Fig. 2) by manipulation of an arm 50 projecting through a slot 51 in the casing body 12. The lever 48 carries the cam surface 36 which is gradually inclined so that by movement of the lever 48, the screw 35 and therefore the pivot 31 of the bell crank 30 is moved toward or away from the partition 13. Any desired setting of the thermostat may be obtained. Adjustment of the thermostat to correspond to the graduation of the scale for indicating the setting of the thermostat may be effected by turning the screw 35.

Assuming the parts to be positioned as shown in Fig. 4, the thermostat operates as follows upon changes in the temperature of the control surface upon which the thermostat is mounted. With an increase in the surface temperature, heat is conducted through the stud 18 at a rate corresponding to the temperature differential between the disk 7 and the control surface. Being applied at the center of the disk, the heat is conducted radially of the disk in all directions thereby quickly affecting all parts of the disk so that the latter warps into the shape shown in Fig. 5. The resulting relative axial movement between the center and periphery of the disk is transmitted through the pin 22 and the motion-augmenting lever 30 and applied to the spring arm 42 in a direction to open the switch 8 and close the switch 9.

Upon a decrease in the temperature of the control surface, the temperature differential is reversed, heat being conducted from the disk 7 to the plate 20 from which it is dissipated by radiation to the air or conduction to the control surface. The resulting cooling of the disk causes the same to become flattened allowing the pin 22 and the lever 30 to be moved by the spring 42 in a direction to open the switch 9 and close the switch 8.

It will be observed that the base 11 and the partition 13 define a dead air space in which the disk 7 is disposed and effectually insulate this space against loss of heat. Loss of heat by circulation of air through this space is reduced to a minimum owing to the small size of the opening in the partition through which the pin 22 projects. Transmission of heat to and from the disk through the pin 22 and the mechanism for actuating the switches is eliminated by constructing the pin of insulating material. For these reasons, conduction of heat to or from the disk 7 except through the stud 18 is effectually prevented so that the thermostat is substantially unaffected by the temperature of the surrounding air. Thus the thermostat responds quickly and accurately to changes in the temperature of the controlling surface.

I claim as my invention:

1. A surface thermostat comprising, in combination, a rigid plate of non-metallic insulating material, a metal sheet mounted on one side of said plate and adapted to lie in contact with a control surface when the plate is mounted on such surface, a disk of bimetallic material lying adjacent said plate on the side opposite said sheet, a stud extending snugly through said plate and having its opposite ends rigid with said sheet and the central portion of said disk and control means responsive to relative axial movement between the central and outer peripheral portions of said disk.

2. A surface thermostat combining a sheet of bimetallic material, a heat conductor adapted to be secured to a control surface and rigid with the central portion of said sheet whereby to support the latter and permit freedom of movement of the outer periphery thereof, a rigid member lying adjacent and supported by said sheet and engaging the same at a plurality of spaced points around the outer edge thereof, and a control device operatively connected to said member and actuated by movement of the member toward and from the center of said sheet.

3. A surface thermostat combining a sheet of bimetallic material, a heat conductor adapted to be secured to a control surface and rigid with the central portion of said sheet whereby to support the latter and permit freedom of movement of the outer periphery thereof, the heat transmitted to said conductor being conducted through said sheet radially in all directions, and control means responsive to movement of said outer periphery.

4. A surface thermostat combining a disk of bimetallic material, a stud having one end abutting against the center of said disk and rigidly secured thereto, means supporting said stud in a position to receive heat by conduction from a control surface, and control means operatively associated with the outer periphery of said disk.

5. A surface thermostat combining a rigid plate adapted to be clamped against a control surface, a piece of bimetallic material of substantial length, a metallic heat conductor supported by said plate and supporting said piece from the central portion of the latter, the heat conducted to said piece being distributed in different directions toward said ends whereby variations in the temperature of said conductor will produce gradual variations in the position of said ends relative to said central portion, and control means responsive to relative movement between said ends and said central portion.

6. In a surface thermostat, the combination of a plate of bimetallic material and a member for supporting said plate adapted to be mounted in contact with a control surface, said member being joined to said plate intermediate the margins thereof whereby to cause distribution of the heat through said plate in different directions from the point of connection, and control means responsive to changes in the temperature of said plate.

7. A surface thermostat combining a casing of insulating material defining a closed chamber and adapted to be mounted on a control surface, an auxiliary casing supported by said first mentioned casing on the side opposite said surface and separated therefrom by an insulating partition, a thermostatic element within said chamber, means extending through said first mentioned casing for conducting heat from said surface to said element, a control instrumentality within said auxiliary casing, and means for imparting the movements of said element to said instrumentality including a member extending through said partition.

8. A surface thermostat combining a thermostatic element comprising a sheet of bimetallic material, a casing composed of insulating material and enclosing said element, a heat conductor extending through said casing and supporting the element therein, said conductor being adapted to lie against a control surface, a control instrumentality outside of said casing, and means for imparting relative axial movements between the central and outer portions of said element to said instrumentality.

9. A surface thermostat combining a thermostatic element comprising a sheet of bimetallic material, a casing composed of insulating material and enclosing said element, a heat conductor extending through said casing and supporting said sheet from its center, an endwise movable member supported from the outer peripheral edge of said sheet and extending through said casing substantially at right angles to said sheet, and control means adapted to be actuated by said member.

10. In a surface thermostat, the combination of a substantially closed casing of heat insulating material adapted to be supported on a control surface and defining a heat insulated chamber, a thermostatic element in said chamber surrounded on all sides by said casing, and a heat conductor extending snugly through said casing and supporting said element in said chamber, said conductor bearing against said surface when said casing is mounted thereon.

11. A surface thermostat combining a substantially closed casing composed of insulating material and defining two chambers separated by a partition, a thermostatic element disposed in one of said chambers, a control instrumentality disposed in the other chamber, an operative connection between said element and said instrumentality, and a heat conducting member extending through said casing for contact with a control surface, said conductor contacting said element within said casing.

12. A surface thermostat combining a casing composed of heat insulating material, a thermostatic element within said casing, a heat conductor extending through one wall of said casing with its outer end adapted to bear against a control surface, said conductor contacting said element within said casing, a control instrumentality outside of said casing and a member extending through and freely movable in an opening in one wall of said casing for transmitting the movements of said element to said instrumentality.

13. A surface thermostat combining a casing composed of heat insulating material, a thermostatic element within said casing, a heat conductor extending through one wall of said casing with its outer end adapted to bear against a control surface, said conductor contacting said element within said casing, control means outside of said casing, and a motion-transmitting connection between said element and control means including a member composed of insulating material and extending through said casing.

14. A surface thermostat combining a casing composed of heat insulating material, a thermostatic element within said casing, a heat conductor extending through one wall of said casing with its outer end adapted to bear against a control surface, said conductor contacting said element within said casing, control means outside of said casing, and a motion-transmitting connection between said element and control means extending through said casing and composed in part of heat insulating material to prevent the conduction of heat through said connection from said element.

15. A surface thermostat combining a casing of insulating material defining a closed chamber and having opposed parallel walls, a sheet of bimetallic material in said chamber, a heat conductor extending through one of said walls and supporting said sheet from the center of the latter, a rigid member lying adjacent and engaging said sheet at a plurality of annularly spaced points around the latter, said member being thereby supported by said sheet, a rod of insulating material connected to said member and extending through an opening in said other wall, and a control device outside of said chamber arranged to be actuated by said rod.

16. A thermostat combining a sheet of bimetallic material, means for supporting said sheet from its central portion, a member supported from the outer periphery of said sheet and movable axially thereof with changes in the temperature of the sheet, a control switch arranged to be actuated by a part movable substantially parallel to said sheet, and a lever swingable about an axis disposed substantially parallel to said sheet and having one arm receiving motion from said member and a second arm for actuating said part.

17. A thermostat combining a disk of bimetallic material, a switch-actuating arm movable in a direction substantially parallel to said disk, a member actuated in accordance with the relative axial movement between the central and outer peripheral portions of said disk, and motion-augmenting lever interposed between said member and said arm.

18. A thermostat combining a disk of bimetallic material, a switch-actuating arm movable in a direction substantially parallel to said disk, a member actuated in accordance with the relative axial movement between the central and outer peripheral portions of said disk, a lever actuated by said member and arranged to actuate said arm, manually operable means by which the position of the lever fulcrum may be shifted whereby to change the setting of the thermostat.

19. A thermostat combining two closely spaced stops, an elongated flexible metal arm fixed at one end with its opposite end movable between said stops, a magnet having opposed pole faces disposed on opposite sides of said arm and acting on said arm as an armature to attract the arm against one or the other of said stops, said faces being spaced slightly farther apart than said stops, a substantially rigid bar having one end secured to said arm adjacent the fixed end thereof, a thermo-sensitive element, a member movable in response to changes in the temperature of said element and acting on the free end of said bar.

20. In a surface thermostat, the combination of a substantially closed casing of heat insulating material adapted to be supported on a control surface and defining a heat insulated chamber, a thermostatic element in said chamber surrounded on all sides by said casing, and a heat conductor extending through said casing and providing a heat conducting connection between said surface and said element.

GEORGE FORREST DRAKE.